United States Patent
Deckert

(10) Patent No.: US 10,035,619 B2
(45) Date of Patent: Jul. 31, 2018

(54) METHOD AND CONTAINER TREATMENT MACHINE FOR EQUIPPING CONTAINERS WITH EQUIPMENT CHARACTERISTICS

(71) Applicant: KHS GmbH, Dortmund (DE)

(72) Inventor: Lutz Deckert, Haltern am See (DE)

(73) Assignee: KHS GmbH, Dortmund (DE)

( * ) Notice: Subject to any disclaimer, the term of this patent is extended or adjusted under 35 U.S.C. 154(b) by 461 days.

(21) Appl. No.: 14/654,614

(22) PCT Filed: Sep. 12, 2013

(86) PCT No.: PCT/EP2013/002734
§ 371 (c)(1),
(2) Date: Aug. 21, 2015

(87) PCT Pub. No.: WO2014/094925
PCT Pub. Date: Jun. 26, 2014

(65) Prior Publication Data
US 2016/0001912 A1    Jan. 7, 2016

(30) Foreign Application Priority Data
Dec. 21, 2012  (DE) ................ 10 2012 025 149

(51) Int. Cl.
*B65C 3/26*     (2006.01)
*B05D 7/02*     (2006.01)
(Continued)

(52) U.S. Cl.
CPC ............. *B65C 3/26* (2013.01); *B05D 7/02* (2013.01); *B65G 47/74* (2013.01); *B65G 47/847* (2013.01)

(58) Field of Classification Search
USPC ................................... 156/60, 156
See application file for complete search history.

(56) References Cited

U.S. PATENT DOCUMENTS 2,981,432 A * 4/1961 Flood ................ B65C 3/10
141/98
3,064,714 A * 11/1962 Flood ................ B65C 9/06
101/38.1
(Continued)

FOREIGN PATENT DOCUMENTS

DE      4125579     2/1993
DE      69629203    4/2004
(Continued)

*Primary Examiner* — Jeffry H Aftergut
(74) *Attorney, Agent, or Firm* — Occhiuti & Rohlicek LLP

(57) ABSTRACT

A container treatment machine has treatment positions provided on a circumferential transport element rotating about a vertical machine axis. Each has a container carrier, a centering element, an aggregate, a control valve, and an actuation element. The treatment position clamps empty containers with a clamping force between the carrier and the cone. The actuation element generates the container clamping force. The control valve controls flow through the channel. Containers lying in a sealed position against the centering cone are loaded with pressure medium that travels through the channel to generate a container-stabilizing internal pressure. The control valve, which is in the centering element, causes container pre-tensioning by being opened by a container clamping force that acts between the centering cone and the container to pretension the container.

17 Claims, 6 Drawing Sheets

(51) Int. Cl.
*B65G 47/74* (2006.01)
*B65G 47/86* (2006.01)

(56) References Cited

U.S. PATENT DOCUMENTS 3,261,734 A    7/1966  Long
3,816,207 A *  6/1974  Robertson ............... B41F 17/14
                                                    101/7
4,315,795 A    2/1982  Jodrey et al.

FOREIGN PATENT DOCUMENTS

DE      60208736      9/2006
SU        470410 A *  8/1975
WO      WO97/13645    4/1997

* cited by examiner

METHOD AND CONTAINER TREATMENT MACHINE FOR EQUIPPING CONTAINERS WITH EQUIPMENT CHARACTERISTICS

RELATED APPLICATIONS

This application is the national stage entry of international application PCT/EP2013/002734, filed on Sep. 12, 2013, which claims the benefit of the Dec. 21, 2012 priority date of German application DE 102012025149.1, the contents of which are herein incorporated by reference.

FIELD OF INVENTION

The invention related to container processing, and in particular to application of equipment characteristics to thin-walled bottles or similar containers that are empty of liquid.

BACKGROUND

When applying equipment characteristics to a container, it is preferable to securely hold the container. Typically, one holds the container between a container support and either a centering element or a centering cone that lies against the container opening. The container support then causes a controlled rotation of the container about a vertical container axis.

In many cases it is necessary to label or print on thin-walled empty containers. Examples include thin-walled plastic or PET containers, including bottles. Such containers are often made by blow molding. Because these containers have low inherent stability, it is useful to pre-tension them with gas. The high pressure gas supports the walls so that the bottles are neither deformed nor destroyed by the container clamping force needed to apply the equipment characteristics.

Known pre-tensioning methods feature having a centering cone form a tight seal against the container mouth and having the centering element opening a control valve to let in high pressure gas. The pressure is usually generated by cam control with in each case an actuation element or linkage interacting with a control cam. The element or linkage acts on the centering element via a pressure spring. As a result, the pressure or container clamping force acting between the centering element and the container rises suddenly immediately after lowering the centering element onto the container. Since this occurs before high-pressure gas has stabilized the container, container damage can result.

In known labeling machines, a control disk opens the control valve for the pressure medium depending on the rotary position of the rotor. This makes it possible to dispense support medium even when there is no container at the relevant treatment position.

In labeling machines, it is also known to make the centering elements so that actuating the control valve to release the pressure medium takes place by the particular container and by raising the centering cone of the centering element. The force needed for this is, however, determined by the pressure of the support medium. As container walls become ever thinner, they become increasingly unstable when empty. This results in a considerable disadvantage. Loading the containers with an elevated internal pressure that stabilizes them means that a high force is needed between the container and the centering cone when the container is still not sufficiently stabilized.

SUMMARY

The invention provides a method that avoids the above drawbacks of the prior art and allows the application of equipment characteristics onto empty thin-walled containers with improved operating reliability and with gentle treatment of the containers.

In one aspect, the invention features a method for applying equipment characteristics to empty thin-walled bottles using a container treatment machine. The container treatment machine has treatment positions on a circumferential transport element that rotates about a vertical machine axis. The containers on the treatment positions are clamped between a container support and a centering cone of a centering element by a container clamping force that acts between the container and the centering cone. The transport element moves the containers past an aggregate that applies an equipment characteristic. Gas pressure stabilizes the containers by pre-tensioning them. A control valve controls this gas pressure. The centering cone, in turn, controls the control valve. The container has an opening that is sealed against the centering cone. The method includes executing a first container-clamping phase, opening a control valve prior to the end of the first container-clamping phase, and executing a second container-clamping phase. Executing the first container-clamping phase includes causing a container to sustain a clamping force that increases from a first value to a second value. Executing the second container-clamping phase includes causing a container to sustain a clamping force that increases from the second value to a third value. Opening the control valve comprises causing the container clamping force to open the control valve, thus allowing pre-tensioning of the container.

Practices of the invention include those in which the container clamping force increases continuously during the first and second phases, those in which it increases in stages, and those in which it increases only in the first phase.

In other practices, the container-clamping force is a dependent variable that varies in response to a change in an independent variable to define a force function. The force function is piecewise linear with a slope in the first phase that has a greater absolute value than the slope in the second phase.

Other practices include causing an actuation element to generate the clamping force. These include embodiments in which the actuation element is under path control and embodiments in which it is under power control.

In other practices, the actuation element interacts with a control cam that acts on a structure selected from the group consisting of the container support and the centering cone. Among these are practices in which the control cam acts with the aid of a spring element. Also among these embodiments are those in which the clamping force during the first phase is generated at least in part by the spring element. In these practices, the spring element pretensions the control valve when the control valve is in a closed state.

In yet other practices, the control valve opens as a result of relative movement between the centering cone and a housing of the centering element.

Further practices include those in which, after the first phase, a label is applied to the container, and those in which, after the first phase, the container is printed upon.

In another aspect, the invention features an apparatus comprising a container treatment machine. Such an apparatus includes treatment positions provided on a circumferential transport element rotating about a vertical machine axis. Each treatment position comprises a container carrier, a centering element, an aggregate, a control valve, and an actuation element. The centering element comprises a centering cone with one or more walls that forms channel. The treatment position clamps empty containers with a container clamping force between the container carrier and the centering cone. The transport element moves the containers past the aggregate, which then applies an equipment characteristic. The actuation element generates the container clamping force. A control valve controls flow through the channel so that containers lying in a sealed position against the centering cone are loaded with pressure medium that travels through the channel. This pressure medium generates an internal pressure within the container to stabilize the container. The control valve, which is provided in the centering element, causes pre-tensioning of the container when a container clamping force that acts between the centering cone and the container is opened. This pre-tensions the container.

Some embodiments includes a spring, a valve element, and a housing that houses the centering element. The valve element extends along an axis of the housing. The centering cone is held on the valve element. The spring pre-tensions the valve element into a first position. When the valve element, which in some embodiments is a piston, is in the first position, the control valve is closed. When the valve element is moved into a second position against action of the spring element, the control valve is opened.

In some embodiments, the spring causes generation of pressure in the first phase.

As used herein, equipment characteristics include elements that are applied onto the containers for providing information, advertising, notice, proof of originality, and to create a desired visual appearance of the containers. Equipment elements include labels, bands, foil wrappings, and printed images applied onto the containers, as well as printing aggregates.

As used herein, terms such as "substantially," or "approximately" are intended to mean deviations from the exact value in each case by +/−10%, and preferably by +/−5% and/or deviations in the form of changes that are not significant for function.

Further developments, benefits and application possibilities of the invention arise also from the following description of examples of embodiments and from the figures. In this regard, all characteristics described and/or illustrated individually or in any combination are categorically the subject of the invention, regardless of their inclusion in the claims or reference to them. The content of the claims is also an integral part of the description.

BRIEF DESCRIPTION OF THE FIGURES

These and other features of the invention will be apparent from the following detailed description and the accompanying figures, in which.

DETAILED DESCRIPTION

Figure 1:
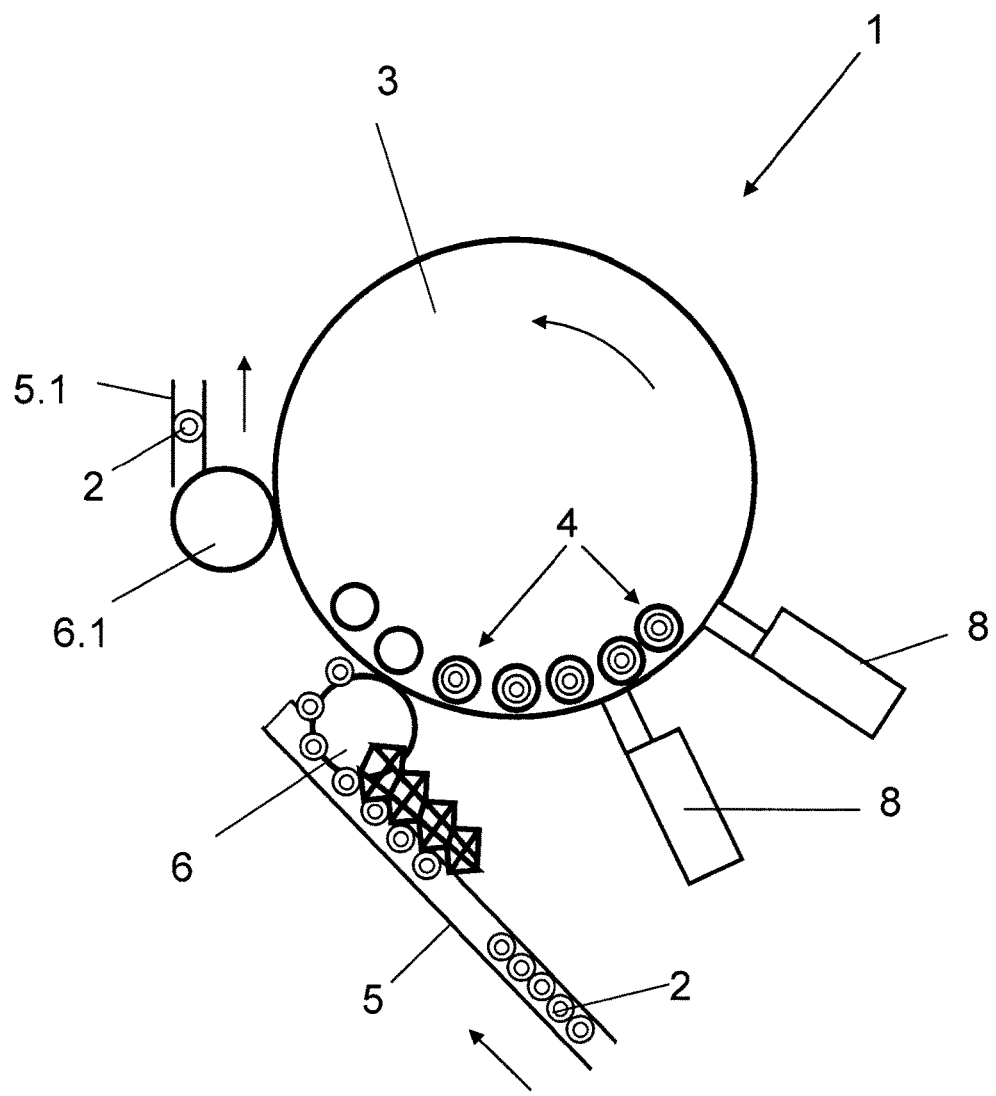
FIGS. 1 and 2 show a simplified representation of a labeling machine from above and from side.

FIG. 1 shows a labeling machine 1 for labeling empty thin-walled containers 2 such as blow-molded bottles made of plastic or PET. The labeling machine 1 has a rotor 3 that rotates continuously about a vertical machine axis MA. The rotor 3 forms a plurality of treatment positions 4 on its circumference.

Through a container inlet 6, an external conveyor 5 supplies these treatment positions 4 with empty containers 2 that are to be labeled. The treatment positions 4 move containers 2 that are to be labeled past a labeling aggregate 8 that does not move with the rotor 3.

Figure 2:
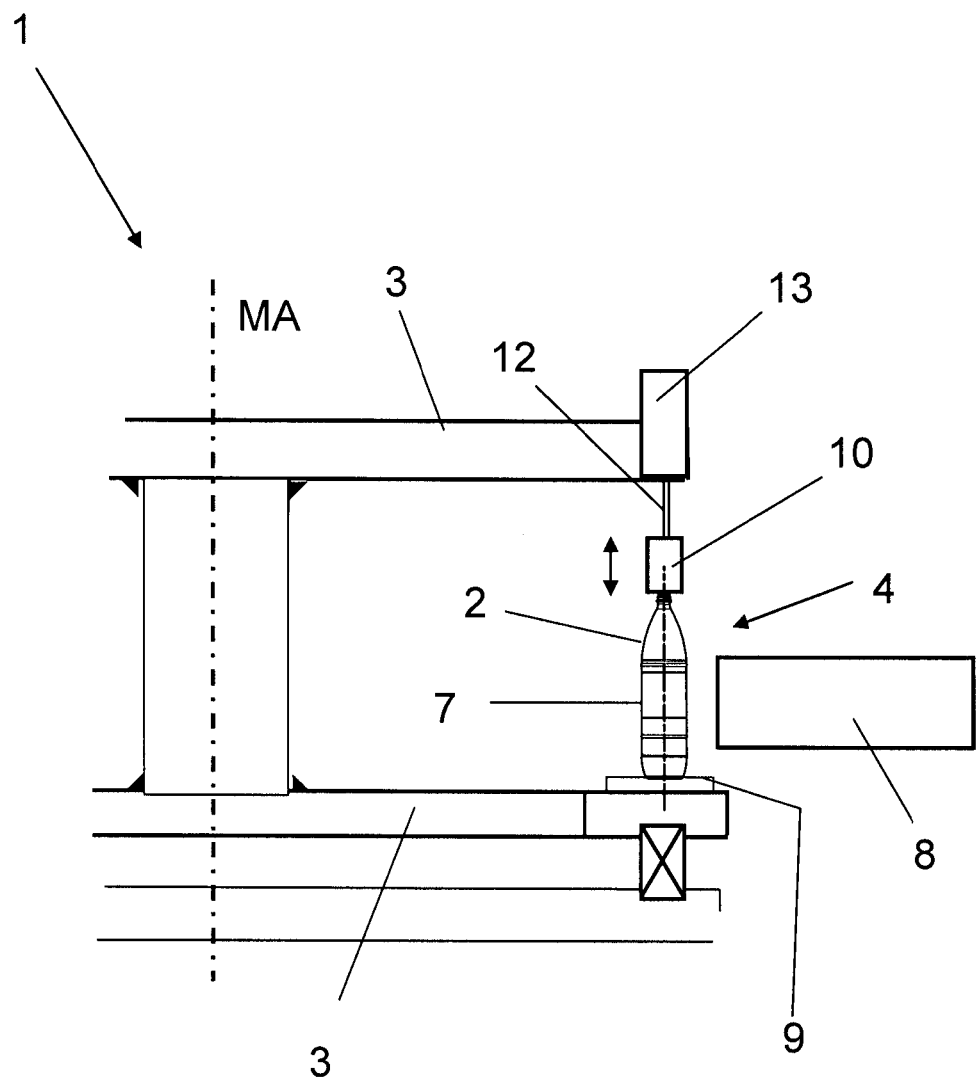

Each container 2 stands upright on its treatment position 4 with its container axis parallel to the machine axis MA. As shown in FIG. 2, the container 2 is clamped between a lower rotary plate 9, on which it stands on its base, and a top centering element 10, which extends by a centering and sealing cone 11, best seem in FIG. 4, into the container mouth 2.1, thereby sealing it. The labeled empty containers 2 are removed from the treatment positions 4 on a container outlet 6.1 and supplied by an external conveyor 5.1 to a further use, for example to a filling machine for filling the containers 2.

Referring to FIG. 2, a linkage 12 connects the centering element 10 to an actuation device 13. Following the transfer of a container 2 to a treatment position 4, the centering element 10 for clamping that container is lowered from a raised position to receive the container 2. The labeling of the containers 2 takes place by rolling the labels 7. This is carried out by clamping the container between the rotary plate 9 and the centering element 10 and driving the rotary plate 9 to rotate the container about its container axis. The centering element 10 is later lifted to release the container 2 on the container outlet 6.1.

To achieve an adequate stability of the empty thin-walled containers 2 during labeling, the containers 2 are each loaded internally with high-pressure gas. The gas is preferably sterile gaseous and/or vaporous pressure medium, for example, sterile compressed air. The gas-loading is carried out by the centering cone 11 when it is sealed against a container mouth 21. A control valve 14 provided in the centering element 10 controls the loading of the container interior with pressure medium. Lowering the centering element 20 or the centering cone 10 onto a container 2 controls the control valve 14. In particular, lowering the centering element 20 or the centering cone 10 opens the control valve 14 and allows entry of pressure medium into the container's interior while the centering cone 11 lies pressed into sealing position at the container's opening 2.1.

The actuation element 13 controls the force with which the centering cone 11 lies against the container mouth 2.1, i.e. the container clamping force K. It does so in a way that causes it to follow curve I in FIG. 3. A first phase of the container-clamping procedure extends between times t0 and t1 in FIG. 3. During this first phase, a low container-clamping force K rises over time. Eventually, and in particular, at time t3, the container-clamping force K grows large enough to open the control valve 14 and to seal the centering body 11 against the container 2. Meanwhile, the gradually increasing internal pressure p1 becomes sufficient to stabilize the container. This occurs by the end of the first phase and sometimes even before the end of the first phase, for example by the time t4.

The second phase of the clamping extends between t1 and t2. During this second phase, the internal pressure of the container is p1. The container has thus become stable enough to sustain a gradual increase in the container clamping force K. The actuation element 13 thus gradually increases the clamping force from an intermediate clamping force K1 to a final clamping force K2. This transition is carried out by linearly increasing pressure, though with a slope steeper than that used during the first phase. The final clamping force K2 is then maintained at least until the end of the labeling process.

Figure 3:
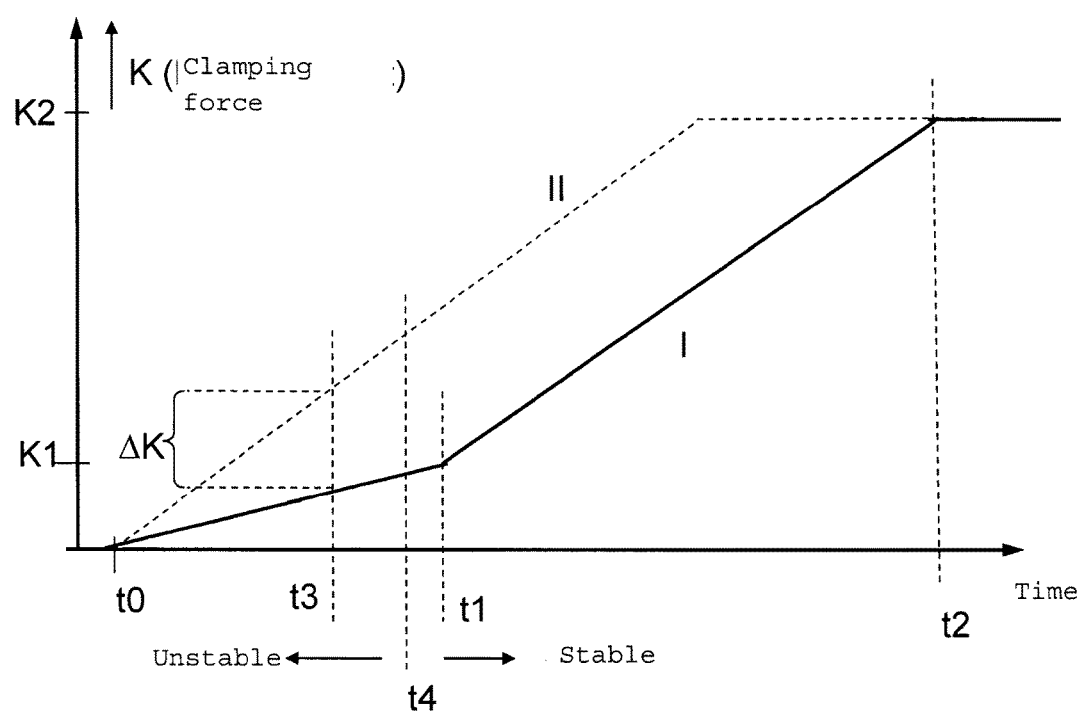
FIG. 3 is a graph of container clamping force as a function of time in the labeling machine shown in FIGS. 1 and 2.

For comparison, FIG. 3 also includes a curve II showing the evolution of the container clamping force K in a conventional cam-controlled centering element acting that acts on a containers using pressure springs. As can be seen in curve II, in these conventional centering elements, the container clamping force acting on the particular container 2 is higher by the amount ΔK at t3 when the valve opens, before the container has achieved adequate stability. This creates the risk of damage to the containers 2 due to application of higher container clamping force than the container can sustain. Force-controlled actuation of the centering element 13 as described herein effectively avoids such damage to the containers 2.

Figure 4:
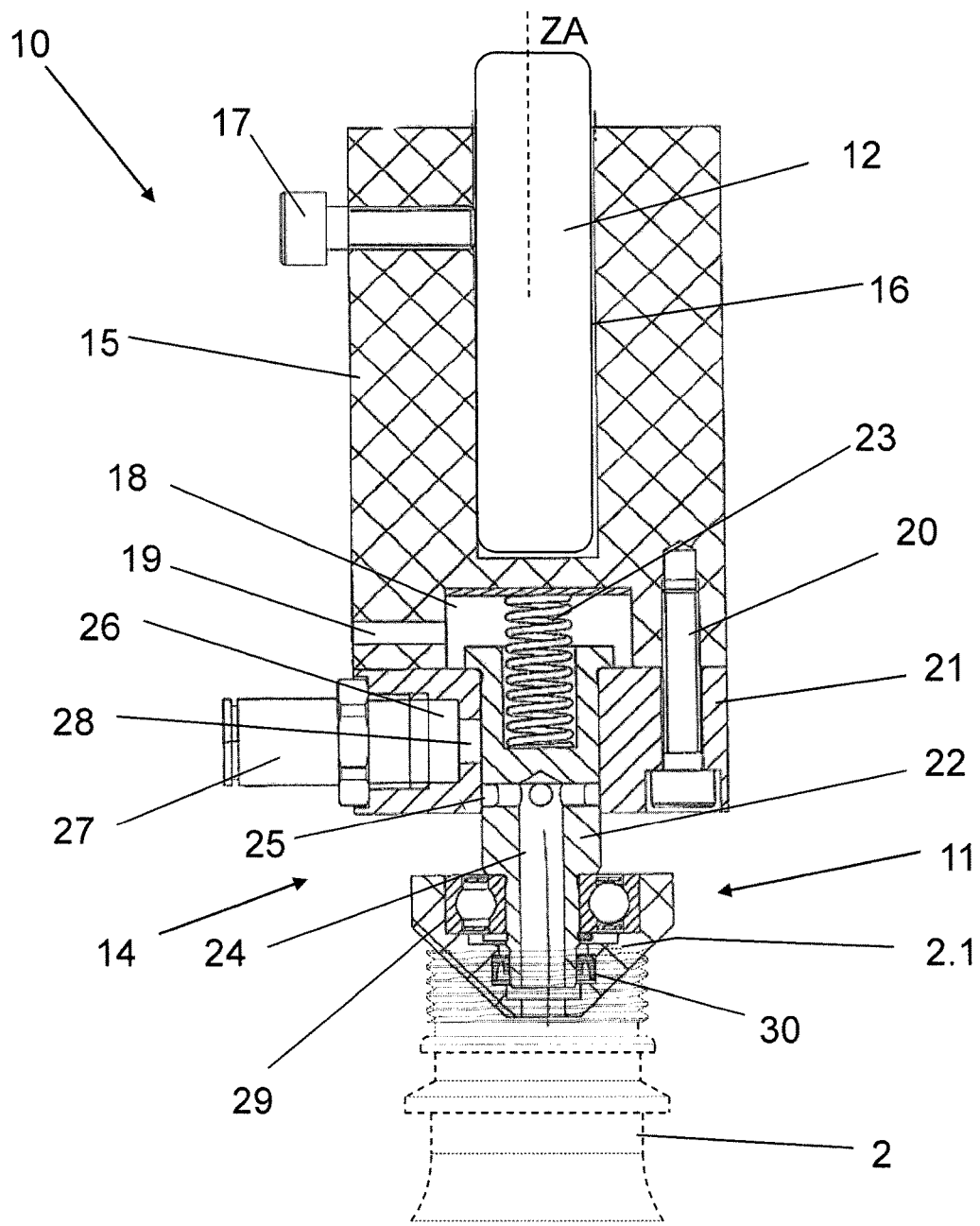
FIG. 4 is a magnified representation, of a centering element of the labeling machine shown in FIGS. 1 and 2 together with a partial representation of a bottle in the area of its bottle mouth.

Referring to FIG. 4, the centering element 10 has a centering element housing 15 with an opening 16 that receives a lower end of the linkage 12. A clamping screw 17 provides a way to detachably secure the centering element 10 on the linkage 12.

On its underside, the housing 15 forms a piston space 18 that is connected to the environment by a ventilation channel 19 A cover 21 seals the piston space 18 on the underside of the housing 15. Screws 20 hold the cover 21 on the housing 15.

Within the cover 21 is a centering or valve piston 22 that forms part of the control valve 14. The valve piston 22 moves axially relative to a vertical centering element axis ZA against the effect of a first pressure spring 23 between a lower position and an upper position. The lower position, which is shown in FIG. 4, corresponds to a closed control valve 14. As the valve piston 22 proceeds toward its upper position, it reaches a point at which the control valve 14 opens.

The first pressure spring 23 acts between the valve piston 22 and the base of the piston space 18. Within the valve piston 22, there lies a first channel 24 that is arranged on the same axis as the centering element axis ZA. At the lower end of the valve piston 22, the first channel 24 opens. The first channel 24 protrudes past the underside of the cover 21 and connects, at its top end, to an annular channel 25 that concentrically encloses the centering element axis ZA. The annular channel 25 is open at the lateral surface of the valve piston 22.

Within the cover 21, a second channel 26 connects to a pressure source via a connecting pipe, only a connecting piece 27 of which is illustrated. The second channel 26 has a control window 28. When the control valve 14 is closed, as shown in FIG. 4, the valve piston 22 reaches its lower position. In the lower position, the lateral surface of the valve piston 22 seals the control window 28. As the control valve 14 opens, the valve piston 22 reaches its upper position. In the upper position, the valve piston 22 is arranged congruently with the circumferential groove 25 and thus unseals the control window 28.

The first pressure spring 23 moves the valve piston 22 out of its lower position and into its upper position. It does so as the centering cone 11 comes to rest against the mouth 2.1 of the container 2 and seals the container 2 adequately. As shown in FIG. 3, the valve piston 22 reaches the upper position long before the end of the first phase, i.e. at time t3. Only at the end of the first phase does the valve piston 22 lie against the base of the piston space 18 so that the further rise in the container clamping force K is transferred from the housing 15 directly to the centering cone 11.

A ball-bearing 22 mounts the centering cone 11 on the valve piston 22. As a result, the centering cone 11 rotates freely about the centering element axis ZA. This means that, while labeling a container 2, it is possible to rotate the container 2 about the centering element axis ZA without also moving the valve piston 22. A seal 30 seals the gap between the valve piston 22 and the centering cone 11.

Figure 5:
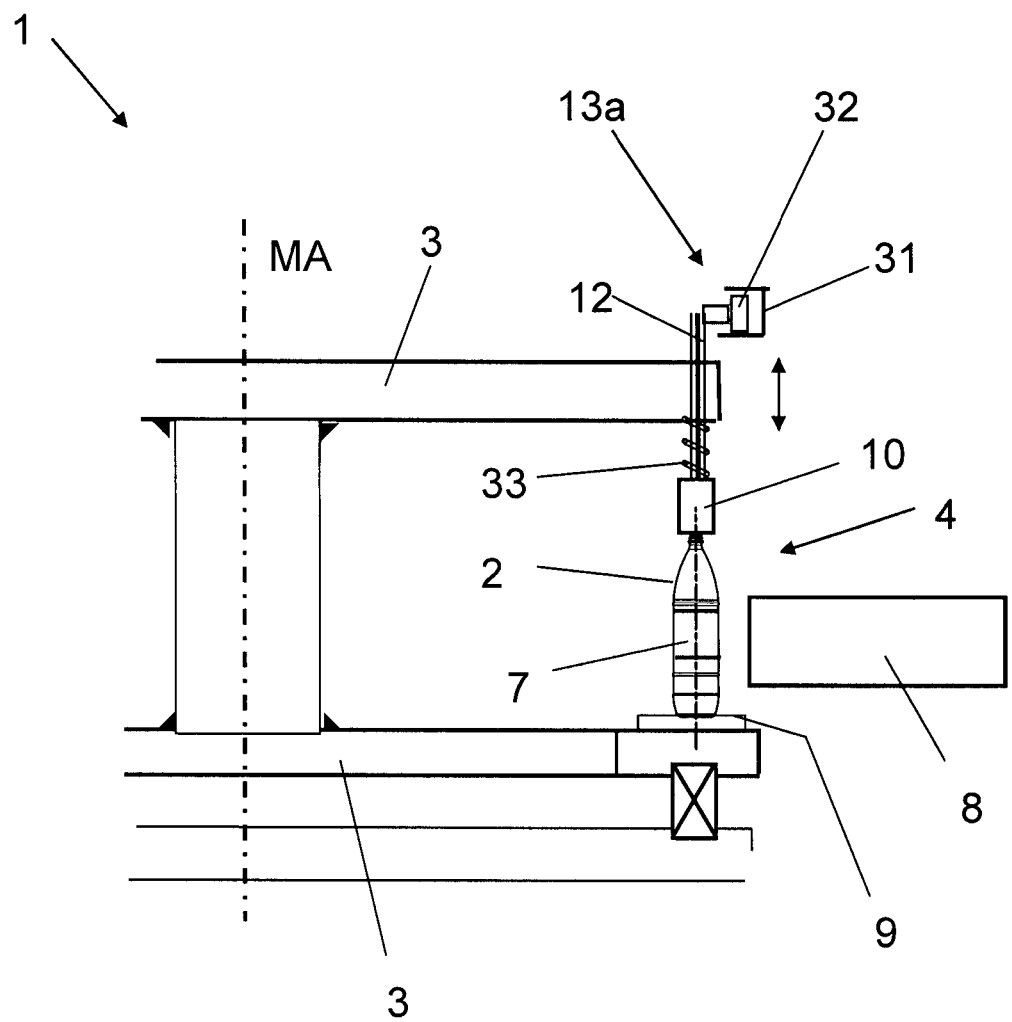
FIG. 5 is a side view of another embodiment of the invention.

FIG. 5 shows a further embodiment of the labeling machine 1 that differs from the previously described embodiment only in that the lowering and pressing movement of the centering element 10 is path-controlled instead of power-controlled. This is implemented by having a lifting-and-control cam 31 that does not rotate with the rotor 3. A cam follower 32 provided on the linkage 12 interacts with the lifting-and-control cam 31. In this embodiment, a second pressure spring 33 contributes to the container clamping force K of the centering element 10 by acting acts between the part of the linkage comprising the cam follower 32 and the centering element 10. The second pressure spring 33, the lifting-and-control cam 31, and the cam follower 31 together form an actuation element 13a.

In operation, the embodiment illustrated in FIG. 5 causes two phases in the clamping of the container 2 at the treatment position. The two phases are shown in the curve I in FIG. 6, which shows the container clamping force K as a function of rotation angle w of the rotor 3. As shown in curve I, during a first phase between w0 and w1 the container clamping force K rises slowly until it reaches the intermediate clamping force K1. During a second phase between w1 and w2, the container clamping force K rises more rapidly until it reaches the final clamping force K2. In other words, the function that relates clamping force K to rotation angle w has a discontinuous first derivative, with the greater first derivative corresponding to higher rotation angles. The point of discontinuity occurs at w=w1.

During the first phase, the container clamping force K is sufficient to open the control valve 14 at w3 and to produce the sealed position between the centering body 11 and the container 2. In addition, at some point during the first phase, for example at w4, enough pressure medium will have entered the container to stabilize it. The container clamping force K during the first phase allows the container 2 to be adequately stable at the end, and preferably before the end of the first phase at w4 by a sufficiently high internal pressure of the container p1 generated by the support medium. The final clamping force K2 is again maintained at least until the end of the particular labeling process.

Figure 6:
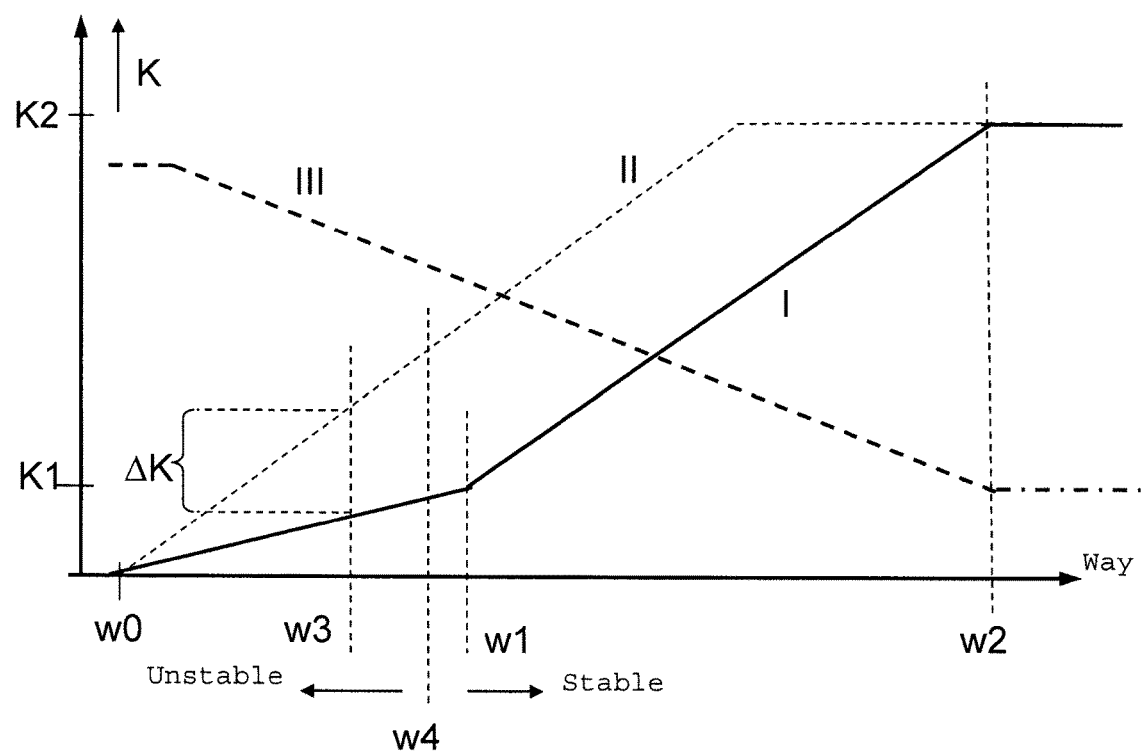
FIG. 6 shows the container clamping force as a function of rotary position of a rotor of the labeling machine shown in FIG. 5.

Curve II in FIG. 6 shows the evolution of the container clamping force K in conventional cam-controlled centering elements acting on container with pressure springs. It can be seen from the course of curve II that with these conventional centering elements, the container clamping force K acting on the particular container 2 is higher by the amount ΔK at the time at which the particular container is still not adequately stable. This raises the risk of container-damage due to excess container clamping force. A clamping system that uses the principles of the invention thus avoids damage to containers 2 resulting from a force by force-controlled actuation of a centering element 10 with an actuation element 13 upon a container 2 that has not been pre-tensioned sufficiently to withstand that force.

Curve III in FIG. 6 shows the evolution of force applied by the control cam 31. The reduced rise in the container clamping force K is determined by the first pressure spring 23 which is designed so that in the event of clamping it deforms before the second pressure spring 33 or deforms by a greater amount for a given applied force than the second pressure spring 33. As a result, the valve piston 22 reaches the base of the piston space 18 only at the end of the first phase, at w2.

The first pressure spring 23 is also designed so that the valve piston 22 moves from its sealing position into its opening as soon as the centering cone 11 adequately seals the container mouth 2.1. This occurs long before the end of the first phase, i.e. at w3. Only at the end of the first phase does the valve piston 22 lie against the base of the piston space 18 so that the further rise in the container clamping force K is generated by the second pressure spring 33. In this embodiment, the first and second pressure springs 23, 33 operate in series.

Common to all the embodiments described is that at the end of the first phase, i.e. at t1 and w1, the intermediate clamping force K1 is below the final clamping force K2 at the end of the second phase, i.e. at t2 and w2. In the illustrated examples, the intermediate clamping force K1 at the end of the first phase is no more than 50% of the final clamping force K2. In some embodiments, the intermediate clamping force K1 is around 25%-30% of the final clamping force K2. In either case, the intermediate clamping force K1 is selected such that the container 2 has gained sufficient stability, at least at the end of the first phase, t1, w1. This stability arises from the pressure medium that has already been introduced into the interior of the container 2, either by the open control valve 14 or by internal pressure p1 generated by the pressure medium. This internal pressure p1 is at most equal to or slightly less than the ratio of the intermediate clamping force K1 to the square measure F of the opening cross-section of the container 2 in the area of their container mouth 2.1, i.e. $p1 \leq K1/F$.

In some embodiments, during the second phase, i.e. between t1 and t2 or w1 and w2, further influx of pressure medium into the interior of the container causes the internal pressure p of the container 2 to continue rising to the value p2. In other embodiments, the internal pressure of the container remains constant or substantially constant at the value p1.

The invention has been described above using examples of embodiments. It is clear that numerous modifications or variations are possible without thereby departing from the inventive idea underlying the invention.

Having described the invention, and a preferred embodiment thereof, what is new and secured by letters patent is:

1. A method comprising applying equipment characteristics to empty thin-walled bottles using a container treatment machine having a plurality of treatment positions on a circumferential transport element that rotates about a vertical machine axis, wherein said containers on said treatment positions are clamped between a container support and a centering cone of a centering element by a container clamping force, wherein said container clamping force acts between said container and said centering cone, wherein said containers are moved by said transport element past an aggregate, wherein said aggregate applies an equipment characteristic, and wherein said containers are pre-tensioned for stabilization by gas pressure, wherein said gas pressure is controlled by a control valve, wherein said centering cone controls said control valve, wherein said container has an opening that is sealed against said centering cone, said method comprising executing a first container-clamping phase, opening a control valve prior to the end of said first container-clamping phase, and executing a second container-clamping phase, wherein executing a first container-clamping phase comprises causing a container to sustain a clamping force that increases from a first value to a second value, wherein executing a second container-clamping phase comprises causing a container to sustain a clamping force that increases from said second value to a third value, and wherein opening said control valve comprises causing said container clamping force to open said control valve, thus causing pre-tensioning of said container.

2. The method of claim 1, wherein said container clamping force increases continuously during said first and second phases.

3. The method of claim 1, wherein said container clamping force increases in stages.

4. The method of claim 1, wherein said container clamping force increases only in said first phase.

5. The method of claim 1, wherein said container-clamping force is a dependent variable that varies in response to a change in an independent variable to define a force function, wherein during said first phase, said force function is linear, wherein during said first phase said force function has a first first-derivative, wherein during said second phase, said force function is linear, wherein during said second phase, said force function has a second first-derivative, and wherein said first first-derivative has an absolute value that is greater than an absolute value of said second first-derivative.

6. The method of claim 1, further comprising causing an actuation element to generate said clamping force, wherein said actuation element is under path control.

7. The method of claim 1, further comprising causing an actuation element to generate said clamping force, wherein said actuation element is under power control.

8. The method of claim 7, wherein said actuation element interacts with a control cam that acts on a structure selected from said group consisting of said container support and said centering cone.

9. The method of claim 8, wherein said control cam acts with said aid of a spring element.

10. The method of claim 9, wherein said clamping force during said first phase is generated at least in part by said spring element, wherein said spring element pretensions said control valve when said control valve is in a closed state.

11. The method of claim 1, wherein said control valve opens as a result of relative movement between said centering cone and a housing of said centering element.

12. The method of claim 1, further comprising, after said first phase, applying a label to said container.

13. The method of claim 1, further comprising, after said first phase, printing on said container.

14. An apparatus comprising a container treatment machine, said container treatment machine comprising treatment positions provided on a circumferential transport element rotating about a vertical machine axis, wherein each treatment position comprises a container carrier, a centering element, an aggregate, a control valve, and an actuation element, wherein said centering element comprises a centering cone, wherein said centering cone comprises walls forming a channel, wherein said treatment position is configured to clamp empty containers with a container clamping force between said container carrier and said centering cone, wherein said containers are moved by said transport element past said aggregate, wherein said aggregate is configured to apply an equipment characteristic, wherein said actuation element is configured to generate said container clamping force, wherein flow through said channel is controlled by a control valve, wherein containers lying in a sealed position against said centering cone are loaded with pressure medium that travels through said channel, wherein said pressure medium generates an internal pressure within said container to stabilize said container, wherein said control valve is provided in said centering element, and wherein said control valve is configured to cause pre-tensioning of said container by being opened by a container clamping force that acts between said centering cone and said container to pretension said container.

15. The apparatus of claim 14, further comprising a spring, a valve element, and a housing, wherein said housing houses said centering element, wherein said valve element extends along an axis of said housing, wherein said centering cone is held on said valve element, wherein said spring pre-tensions said valve element into a first position, wherein, when said valve element is in said first position, said control valve is closed, wherein said valve element is configured to be moved into a second position against action of said spring, wherein in said second position said control valve is opened.

16. The apparatus of claim 14, wherein said spring is configured to cause generation of pressure in said first phase.

17. The apparatus of claim 15, wherein said valve element comprises a piston.

\* \* \* \* \*